United States Patent [19]

Noailly

[11] Patent Number: 4,970,048
[45] Date of Patent: Nov. 13, 1990

[54] MIXING GRID WITH FINS FOR NUCLEAR FUEL ASSEMBLY

[75] Inventor: Jean Noailly, Lyons, France

[73] Assignees: Framatome, Courbevoie; Compagnie Generale des Matières Nucléaires, Velizy Villacoublay, both of France

[21] Appl. No.: 373,842

[22] Filed: Jun. 29, 1989

[30] Foreign Application Priority Data

Jun. 29, 1988 [FR] France .................. 88 08759

[51] Int. Cl.$^5$ .............................. G21C 3/34
[52] U.S. Cl. ..................... 376/439; 376/443
[58] Field of Search .............. 376/439, 442, 443

[56] References Cited

U.S. PATENT DOCUMENTS

| 4,726,926 | 2/1988 | Patterson | 376/439 |
| 4,758,403 | 7/1988 | Noailly | 376/439 |
| 4,775,509 | 10/1988 | Noailly | 376/442 |
| 4,844,861 | 7/1989 | Leclercq | 376/439 |

FOREIGN PATENT DOCUMENTS 1439362 4/1969 Fed. Rep. of Germany ...... 176/223

Primary Examiner—Donald P. Walsh
Assistant Examiner—Meena Chelliah
Attorney, Agent, or Firm—Pollock, Vande Sande & Priddy

[57] ABSTRACT

A grid for a nuclear fuel assembly comprises a common frame having an axis and a plurality of beds of plates distributed along the axis. Each bed has a plurality of plates which are mutually parallel and are directed transversely to the plates of the adjacent beds. All plates are secured to the common frame. The plates having a same direction are distributed between a plurality of said beds interleaved with other ones of said beds consisting of plates having another direction, and the plates of the beds placed in an upstream portion of the grid have fins oriented so as to deflect coolant inwardly whereas the plates placed in a downstream portion of the grid have fins oriented so as to deflect the flow coolant outwardly.

8 Claims, 3 Drawing Sheets

MIXING GRID WITH FINS FOR NUCLEAR FUEL ASSEMBLY

BACKGROUND OF THE INVENTION

1. Technical Field

The invention relates to finned grids for nuclear fuel assemblies having a bundle of fuel rods, the grids being of the type comprising several successive beds each formed of parallel plates, the plates of one bed being crossed with those of the following bed so as to define passages for holding the rods in position at the nodal points of a regular lattice and all plates of the grid being fixed to a same frame.

2. Prior Art

Grids of the above-defined type are already known (EP-A-0 239 441) in which all plates having the same orientation are grouped together in the same bed. With this approach, it is possible to hold the rods axially in position provided that some at least of the plates are provided with resilient means exerting on the rods a transverse force applying them against another plate of the same bed. The fins cause mixing of the fluid streams and so a stirring effect which tends to homogenize the temperature of the coolant and so give to the grid a thermohydraulic function.

Fuel assemblies have further already been proposed in which the rods are supported, i.e. held axially in position, by only some of the grids, the others only having a mixing and/or transverse holding function. Publication EP-A-0 187 578 describes such an assembly, having at least one uppermost rod supporting grid and other grids, placed at a lower level, having only a spacer function. Assemblies have also been proposed comprising grids with essentially a thermohydraulic function interposed between supporting grids, in the upper part of the assembly, i.e. in the part where the coolant is at the highest temperature.

SUMMARY OF THE INVENTION

The invention intends to provide a grid with mixing fins which is improved, particularly in that it represents a better compromise between temperature homogenization, bracing of the rods and head loss.

To this end, the invention proposes more particularly a grid of the above-defined type, intended to provide only thermohydraulic and bracing functions, whose plates oriented in the same direction are distributed in several successive beds, the fins of the plates placed upstream of the middle of the grid being oriented so as to deflect the coolant flow inwardly whereas the fins of the plates placed downstream of the middle of the grid are oriented as to deflect the flow outwardly.

With such an arrangement, mixture is enhanced in the central part of the assembly, which is the hottest, and there is stirring of the coolant over a longer assembly length than in conventional grids, because of the increased longitudinal size of the grid. In addition, the grid accelerates flow of the coolant along the rods placed in the center portion, which facilitates heat removal and increases the value of the critical flux.

It will often be necessary to give the beds of plates a symmetrical arrangement with respect to the mid plane of the grid, although this arrangement is not imperative. Such a solution will, in the case of an assembly with square pitch comprising n×n cells, lead to a grid with 4(n+1) plates, the end plates being possibly formed by the ends of the frame. Some central plates may however be omitted in the case where an instrumentation tube is placed in the axis. Although the invention applies particularly well to assemblies in which the rods are distributed in a square array, it is also applicable to assemblies with a triangular array.

As a general rule, the plates of two successive beds having different orientations will be directly jointing or will interfit to increase rigidity. The frame will often be formed of locally recessed plates also having a corner gap, the frame remaining continuous at the level of the beds the most upstream and downstream so as to limit the risks of hooking on between grids of adjacent assemblies during positioning of an assembly.

The invention will be better understood from the following description of particular embodiments, given by way of non-limitative examples, with reference to the accompanying drawings.

DETAILED DESCRIPTION OF PREFERRED EMBODIMENTS

Figure 1:
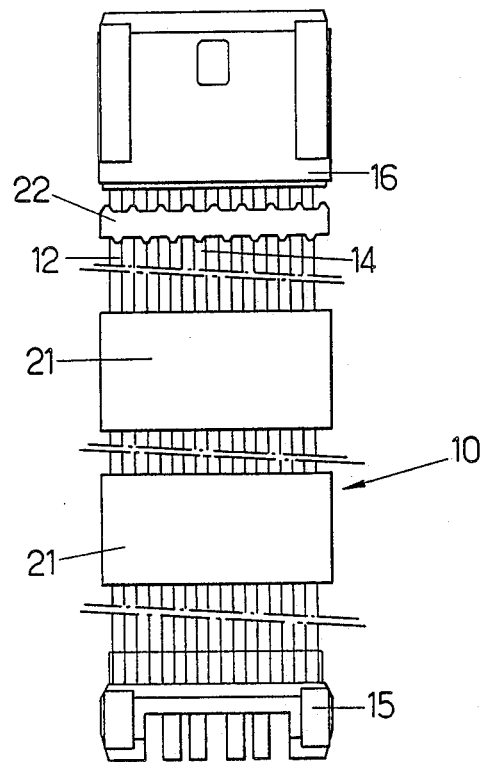
FIG. 1 is an elevational diagram of a fuel assembly to which the invention is applicable.

The invention will now be described in its application to a fuel assembly with a square array whose general construction is shown in FIG. 1, and which can be used in a pressurized light water reactor. The assembly 10 comprises rods of fissile material disposed at the nodal points of a square mesh array, replaced at certain nodes by guide tubes 12. In the center of the lattice of fuel rods, an instrumentation tube 14 may be provided.

The skeleton of the assembly comprises, in addition to guide tubes 12, a lower end piece 15, an upper end piece 16 and grids 21 and 22 fixed to some at least of the guide tubes. Some of these grids, for example the uppermost grid 22 placed immediately under the upper end piece 16, support the fuel assemblies. Grid 22, being in a region of the core where the neutronic flux is reduced, may be of a material selected for its mechanical strength qualities and comprise springs, fixed to or formed by deformation of plates, exerting a force on each rod which applies it against a boss provided on the confronting plate so as to avoid axial movement of the rod.

Grids 21 may however be provided only for thermohydraulic and bracing functions (i.e. for holding the rods transversely in position) and be formed in accordance with the invention.

To better show the fundamental characteristics of a grid in accordance with the invention, a grid first will be described, by way of example, which defines an array of 5×5 cells for receiving rods or guide tubes, it being understood that, as a general rule, an actual grid will have many more cells (for example 17×17).

Figure 2:
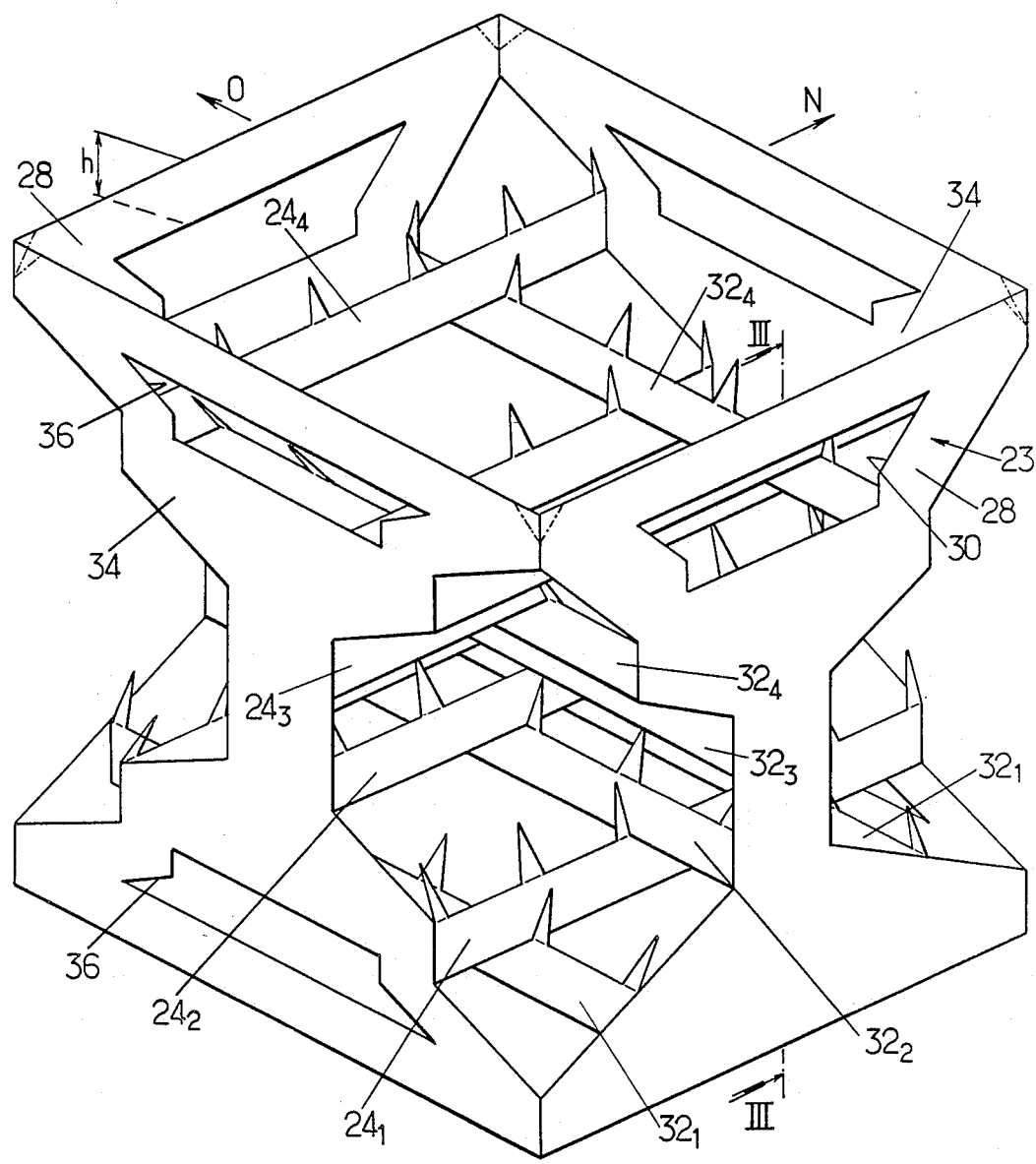
FIG. 2 is a schematic perspective representation of a grid for an assembly comprising 5×5 cells distributed in a square array.

The grid shown schematically in FIG. 2 may be regarded as comprising a frame 23 with four faces providing the overall cohesion of the grid. To this frame are fixed successive beds of plates having two alternate orientations, one of which N will be considered as North-South, and the other O as East-West. The plates 24 with North-South orientation (FIGS. 3 and 4) are distributed in four beds and the plates of the four successive beds will be designated respectively by $24_1$, $24_2$, $24_3$, $24_4$. Each bed is formed of two parallel plates provided with fins. The fins carried by the plates of the beds which are upstream in the flow direction (i.e. of the beds placed before the median plane 26) are angularly located to deflect the coolant streams inwardly. On the other hand, the fins of blades $24_3$ and $24_4$ situated downstream in the flow direction are provided with fins for deflecting the flow outwardly.

It is possible to regard the upper part and the lower part of each of the sides 28 of the frame parallel to plates 24 as forming endmost plates, particularly insofar as the upper end portion is concerned, reduced by an opening 30 to the width h common to all the plates.

Figure 4:
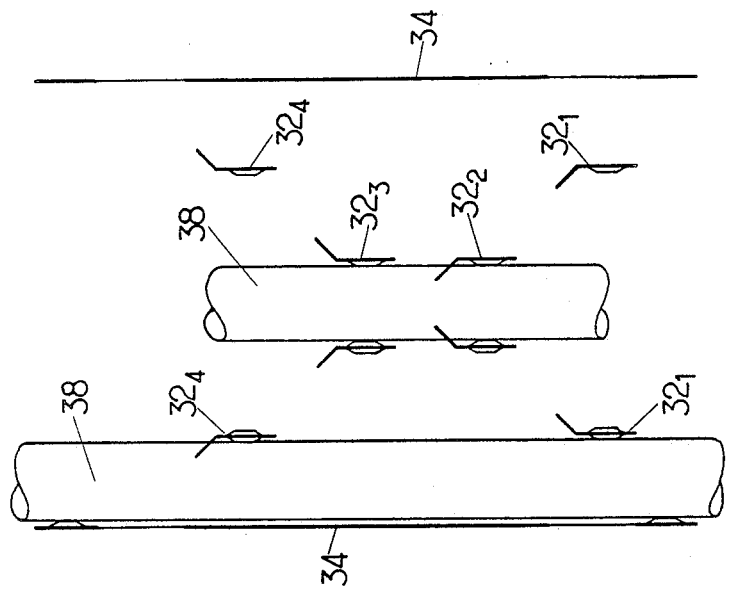
FIG. 4, similar to FIG. 3, shows the plates having an East-West orientation, in section through line III—III of FIG. 2, as well as the bosses for bracing two fuel rods.
Figure 3:
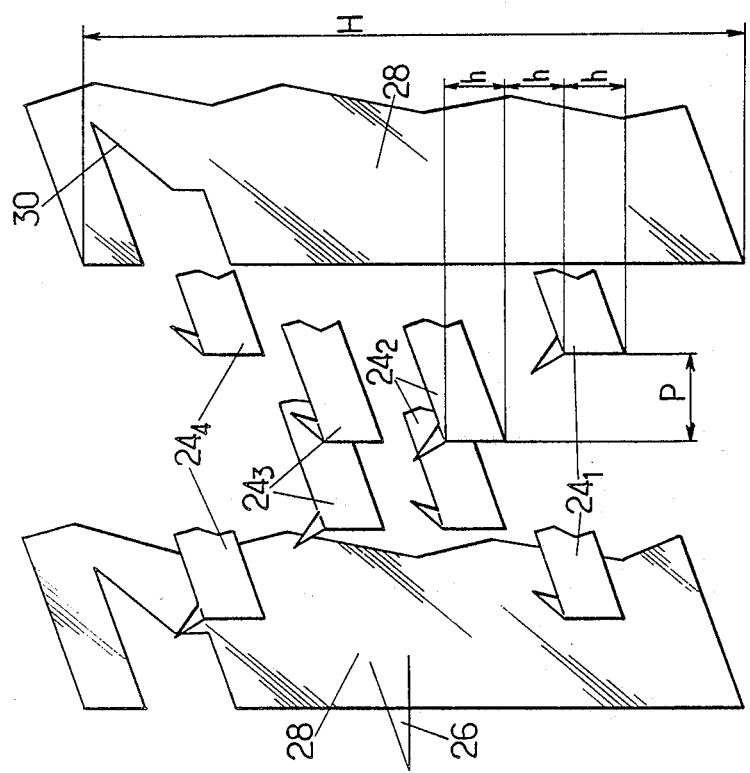
FIG. 3 is a view of half of the grid of FIG. 1 seen in perspective in the North-South direction, the plates having this orientation being the only ones shown.

In the embodiment shown in FIGS. 2 to 4, all plates have the same height h. If the gap between two successive beds of plates 24 were equal to h, the plates $32_1$ to $32_4$ with East-West orientation (FIGS. 2 and 4) and of the same height h, would be simply in contact with plates $24_1$–$24_4$ at the crossing points. In a typical embodiment, the free gap is slightly less than h so that the plates interfit slightly to increase the mechanical strength.

The upper and lower portions of sides 34 of the frame again form endmost plates, without fins. These endmost plates are separated from the rest of the sides by indentations 36.

As plates 24, plates 32 carry fins directing the coolant inwardly in the upstream part of the grid, outwardly in the downstream part.

To reduce neutron absorption by the grid, sides 28 and 34 advantageously have a width at each level just sufficient to carry the respective plates. Thus, angle gaps are formed which are also favorable to the flow of the water constituting coolant and neutron moderator. The top and bottom ends of the corner edges may be ground so as to form chamfers, as shown for example in broken lines in FIG. 2, so as to reduce the danger of the grids hooking onto each other when lowered along an assembly already in place.

Generally, if the distribution pitch of the plates having a same orientation is equal to p, the width L of the grid is equal to n.p in the case of a grid with n cells per side. Since its height H is equal to $2(n+1)h$, the grid has an approximately cubic shape if $p \simeq 2h$. The total number of plates is equal to $4(n+1)$, i.e. twice that of the plates in conventional grids where all the plates are in the same plane.

FIG. 4 shows two fuel rods 38 occupying two cells in a grid in accordance with the invention. The rods bear against bosses formed on the plate defining the respective cell. If the grid is made from zirconium alloy, the bosses may be formed by deformation and possibly partial cutting out of the plate, by means of a method widely used at the present time. While, in a present day grid, a rod is held in position only at a single level, there are several bracing levels in the case of the invention, as shown in FIG. 4; however, the rods may be braced in a first direction at a first level (for example, for the central rod, at the level of plates $32_3$ in one direction, at the level of plates $32_2$ in the other direction in FIG. 4).

The arrangement of fins shown in FIGS. 2 to 4 is not the only one possible. In particular, some fins split at the level of the bracing between two successive beds of plates may be replaced with half-fins. Some of the fins placed at the center of the grid, too close vertically to the fins of an adjacent bed, may be omitted. It can be seen that the grid as formed, having essentially a thermohydraulic function and a cross bracing function, promotes mixing of the water streams and increases the flow rate in the central cells of the assembly, where there is a danger that a critical thermal flux is reached first. Since the grid does not have a function of holding the rods axially in position, it is possible to give to the plates a height h appreciably less than the height they have in conventional grids, which limits the neutron absorption increase as compared with such a conventional grid. In practice, a plate height h of 7 mm is sufficient in order to be able to form thereon a rod bearing boss. Thus grids are obtained having an approximately cubic shape and a height equal to about half the gap at present provided between successive grids.

In the case of an actual assembly, for example an assembly in which the grids define 17×17 cells, the center of the grid will often be occupied by an instrumentation tube taking up a space corresponding to four rods. Then, the distance between North-South and East-West plates at the center of the grid may be equal to twice the distribution pitch of the rods: the water flow will then converge not towards the central cell, but towards four central cells. With such an arrangement, the grid height will be slightly decreased.

Numerous constructional modifications of the invention are possible. In particular, it is possible to replace the rod bracing bosses with additional centering devices. The distribution of the fins may be different from that described, for example so as to take into account the fact that some cells have guide tubes passing thereto rather than rods. The grids of the invention may be used over only part of the length of the fuel assembly or they may alternate with grids providing axial support of the rods in the hottest portions of an assembly. Finally, the grids of the invention may be adapted to a fuel assembly in which the rods are distributed at the nodal points of a rectangular lattice.

I claim:

1. In a nuclear fuel assembly having a bundle of fuel rods, a grid for mixing streams of coolant within the assembly and holding the fuel rods at nodal points of a regular array, comprising a common frame located at a periphery of said grid and having an axis, and a plurality of beds distributed along said axis, each of said beds consisting of a plurality of said plates which are mutually parallel, parallel to said axis and directed transversely to the plates of an adjacent one of said beds to define fuel rod receiving cells, all said plates being secured to said common frame at ends thereof, wherein the plates having a same direction are distributed between a plurality of said beds interleaved with other ones of said beds consisting of plates having another direction, and wherein the plates of the beds placed in an upstream portion of the grid have fins oriented so as to deflect coolant inwardly whereas the plates placed in a downstream portion of the grid have fins oriented so as to deflect the flow coolant outwardly.

2. Grid according to claim 1, wherein said beds of plates have a symmetrical arrangement with respect to a mid plane of the grid, orthogonal to said axis.

3. Grid according to claim 2, wherein said grid has 4(n+1) plates defining n×n cells, n being a predetermined integer.

4. Grid according to claim 3, wherein endmost ones of said plates are formed by ends of the frame.

5. Grid according to claim 1, wherein the plates of two mutually adjacent beds are in mutual contact.

6. Grid according to claim 1, wherein the common frame consists of four flat sides which are hollowed out and has gaps in corners thereof except in end portions in the upstream and downstream directions.

7. Grid according to claim 1, wherein the plates are formed with fuel rod bearing bosses.

8. Grid according to claim 2, wherein said plates are of zirconium-base alloy and have an axial height of about 7 mm.

* * * * *